United States Patent [19]
König

[11] Patent Number: 4,590,916
[45] Date of Patent: May 27, 1986

[54] BAKING OVEN

[76] Inventor: Helmut König, Ursprungweg 70 - 72, Graz, Austria, A-8045

[21] Appl. No.: 693,026

[22] Filed: Jan. 17, 1985

[51] Int. Cl.⁴ .............................................. A21B 1/00
[52] U.S. Cl. ................ 126/21 A; 126/19 R; 126/20; 432/242; 99/443 C; 99/447; 99/352; 34/242; 219/388
[58] Field of Search ............... 126/19 M, 19 R, 20, 126/21 A; 99/352, 443 R, 443 C, 447; 34/208, 242; 432/242, 243, 244; 219/388, 401, 400

[56] References Cited
U.S. PATENT DOCUMENTS

| | | | |
|---|---|---|---|
| 2,236,085 | 3/1941 | Cook | 34/208 X |
| 3,678,244 | 7/1972 | Worline | 99/443 C |
| 4,167,585 | 9/1979 | Caridis et al. | 99/443 C |
| 4,202,259 | 5/1980 | Johansson | 126/20 X |
| 4,493,159 | 1/1985 | Schutz et al. | 432/242 X |

FOREIGN PATENT DOCUMENTS 2530926  2/1984  France ................ 126/19 M

Primary Examiner—Margaret A. Focarino
Attorney, Agent, or Firm—Townsend & Townsend

[57] ABSTRACT

A baking oven has a baking chamber in which plate members carrying the baking good are stepwisely conveyed along an endless path. The baking chamber has a charging and discharging opening through which a branch of this endless path is fed to a charging and discharging station located outside of the baking chamber. Hot air is blown into the baking chamber by means of a blower. In order to prevent that the hot atmosphere within the baking chamber escapes through the charging opening, this opening can be closed by a closure means actuated in synchronism with the steps of movement of the plate members. Further in synchronism with this actuation, a change-over means is actuated which guides the hot air either into the baking chamber or into a by-pass-channel leading back to the blower.

16 Claims, 6 Drawing Figures

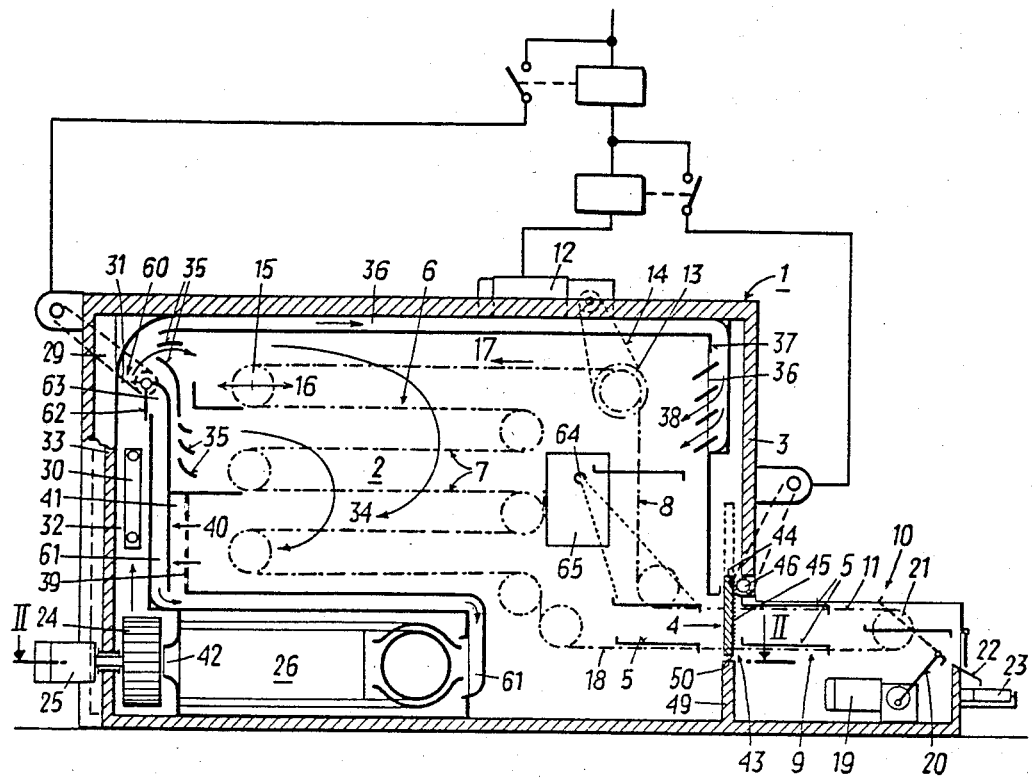
FIG. 1
FIG. 2
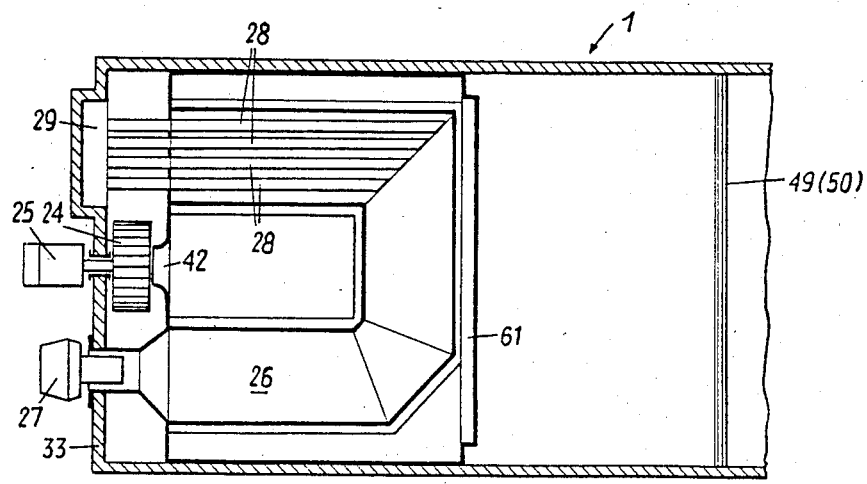

BAKING OVEN

BACKGROUND OF THE INVENTION

The invention refers to a baking oven, and more particularly to a continuously operating baking oven, comprising a baking chamber surrounded by a housing and having a charging opening for the baking good, plate members carrying the baking good being moved within the baking chamber along guide means in an endless path, blowing means for blowing hot air into the baking chamber, heating means for heating this air which is blown through at least one supply opening into the baking chamber and is recycled from the baking chamber to the blowing means.

THE STANDARD OF ART

The known continuously operating baking ovens suffer from the drawback that, when charging the baking oven, hot air escapes from the charging opening, which fact is still enhanced by the action of the blower. The hot air escaping from the baking chamber results not only in an energy loss but also heats in an undesired manner the bakery room in which the baking oven is arranged. This applies particularly for such baking ovens in which a water steam atmosphere is maintained within the baking chamber, whereby finest water droplets of the very wet and condensable steam are precipitated on the dough portions from the steam contacting the dough portions. Steam having the prescribed quality is heavier than hot air and thus flows downwardly and tends to escape from the charging opening which in most cases is positioned within the lower area of the front wall of the baking oven. This makes it also difficult to utilize the so-called natural cloud of gas in the baking chamber, i.e. to utilize the humidity supplied by the baking good itself. These problems are of considerable importance in baking ovens of the kind mentioned above, namely continuously operated baking ovens, because the baking oven is continuously charged and the finished baking good must equally be removed again substantially continuously from the plate members.

SUMMARY OF THE INVENTION

It is an object of the invention to improve a baking oven of the initially mentioned type such that the described escape of hot air and steam, respectively, and the accompanying energy loss is at least considerably reduced.

It is a further object of the invention to prevent that hot air is blown out from the baking chamber by the action of the blowing means.

It is another object of the present invention to improve a baking oven of the kind mentioned above such that heating of the bakery room in which the baking oven is positioned, is considerably reduced.

It is a further object of the present invention to improve a baking oven such that the working conditions for the personnel are improved, particularly the charging operation, namely placing the dough pieces to be baked onto the plate members, and removal of the finished baked good from the plate members.

It is another object of the present invention to improve a continuously operating baking oven so that it has a simple and reliable construction.

According to the invention, these advantages are obtained by the fact that a changeover means for selectively feeding the air either into the baking chamber or into a by-pass-channel by-passing the baking chamber and leading back to the blowing means is provided within the flow-path of the air flowing from the blowing means to the baking chamber and by the fact that actuation of this change-over means is effected in timely relationship with steps of the stepwisely moved plate members and with actuation of a closure means for the charging opening, through which opening a branch of the endless path of the plate members is passed to a charging and discharging station located outside of the baking chamber. The invention is based on the finding that the charging opening of the baking oven must be closed between each charging operation and between each discharge operation for preventing as well as possible that the baking chamber atmosphere escapes from the baking space. Further, provision must be made that during those time intervals during which the closure means for the charging opening must at any rate be in open position for introducing a charged plate member into the baking chamber or for removing a plate member carrying finished baking good from the baking chamber, the air flow within the baking chamber is by-passed and directly recycled into the baking chamber in order to prevent that the hot air blown into the baking chamber expells the baking atmosphere through the charging opening. The initially mentioned energy losses are substantially reduced by the construction according to the invention. Further, heating of the bakery room is reduced so that the working conditions for the personnel is improved, particularly due to the fact that charging operation, i.e. placing the dough pieces to be baked onto the plate members, and removal of the finished baked good from the plate members is effected outside of the baking space and manual operation within the baking space is not necessary in contrast to many known constructions. Synchronization or actuating in beat, respectively, of the change-over means with the actuation of the closure means is possible without problems by using switching means known per se, such, that switching-over of the flow of air is effected as soon as the closure means of the charging opening is open, and vice versa, the switching operation being clocked to the step-wise movement of the plate members such that the closure means is maintained closed during the pauses of the step-wise movement of the plate members.

According to a preferred embodiment of the invention, the change-over means has a pivotable lid movable between two end positions, in the one of which the lid opens the supply opening leading the hot air into the baking chamber and closes a further supply opening leading the air into the by-pass-channel, and in the other of its end positions, the lid closes the supply opening leading into the baking chamber and opens the further supply opening leading into the short circuit passage. This results in a particularly simple construction of high operation reliability. Within the spirit of the invention, it is convenient if the supply openings leading into the baking chamber and into the by-pass-channel are arranged at the rear wall of the baking chamber located opposite the charging opening. Preferably further air supply openings are arranged at the front wall of the baking chamber located opposite said mentioned rear wall and are supplied with air via an air passage, particularly extending at the roof of the baking chamber and branched-off downstream of the change-over means. This results in a flow of hot air through the baking chamber which is most favourable for the baking good.

According to a further development of the invention, the by-pass-channel opens into a passage which leads from a suction opening provided in the baking chamber to the suction side of the blowing means. Thus, a part of the air passage by-passing the baking chamber and a part of the passage for extracting air from this chamber are combined to a single constructional part, thereby reducing the expenditure and space requirement.

The closure means for the charging opening for the baking good can be designed as a door or lid, but it is, within the spirit of the invention, more favourable if this closure means is a valve plate which is guided on the housing wall for vertical upward and downward movement and which can be moved by a drive means between an end position clearing the path of the plate members carrying the baking good and an end position closing the charging opening. In this case, the plate members can be moved along their endless path in the form of hangers. It is, however, more convenient to guide the plate members along rails provided on the wall of the baking chamber and being sunk into the wall of the baking space and, respectively, or being interrupted, so that these rails do not disturb the movement of the valve plate. For this purpose, each plate member is, according to a further development of the invention, guided by means of two rollers fixed at both sides of the plate member on an upper pair of rails, which is sunk into the wall of the baking chamber at the area of the charging opening, and is further guided by means of two rollers arranged at either side on a further lower non-sunk pair of rails which is interrupted at the area of the charging opening. Because this interruption acts only on one pair of rollers running within the lower pair of rails of each plate member, each plate member is reliably guided and secured against tilting movement also within the area of the charging opening and the interruption of the lower pair of rollers, respectively. If guide plates for the valve plate are fixed to the edges of the interruption of the lower pair of rails, the valve plate is better guided. For improving the seal at the charging opening and for reducing the stroke of the valve plate required for closing this charging opening, the valve plate may engage at the end of its downward movement a counter stop plate stationarily arranged within the rails but below the path of movement of the plate members.

BRIEF DESCRIPTION OF THE DRAWINGS:

In the accompanying drawings, the invention is schematically illustrated with reference to preferred embodiments. FIG. 1 shows in a vertical section along line I—I of FIG. 2 a first embodiment of a baking oven according to the invention. FIG. 2 shows a cross section along line II—II of FIG. 1.

Figure 3:
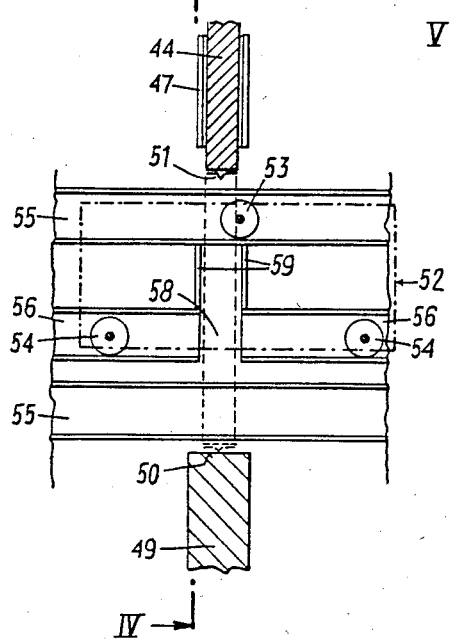
FIG. 3 shows in an enlarged scale a vertical section through the charging opening.
Figure 4:
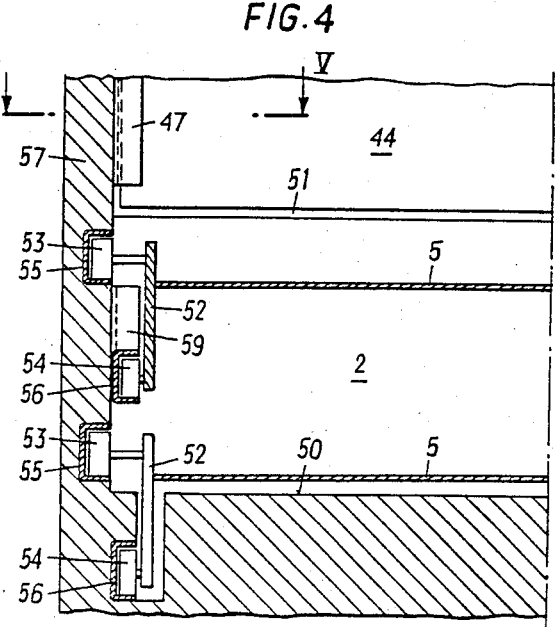
FIG. 4 is a section along line IV—IV of FIG. 3
Figure 5:
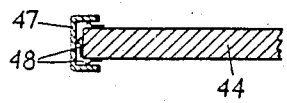
FIG. 5 is a section along line V—V of FIG. 4.

DESCRIPTION OF THE PREFERRED EMBODIMENTS:

In the embodiment according to FIGS. 1 to 5, the baking oven has a housing 1 having a baking chamber 2 enclosing a baking space, said housing being provided at its front wall 3 with a charging opening 4. Plate members 5 carrying the baking good are guided within the baking chamber 2 along positive guide means in an endless path 6. The path 6 has a plurality of superimposed horizontal strands 7 within the baking chamber 2 and a vertical strand 8 steeply extending in upward direction from the charging opening 4. A branch 9 of the path 6 extends from the baking chamber 2 through the charging opening 4 to a charging and discharging station 10 for the baking good, which station 10 is located outside of the baking chamber. The individual plate members 5 are interconnected by means of a chain 11 and are stepwisely moved along the endless path 6 by means of a motor 12 and a gear driving a driving gear wheel 13 for the chain 11 via a driving chain 14. A deflection gear wheel 15 immediately following driving gear wheel 13 is bearingly supported for being movable in direction of the twin arrow 16 and is thus designed as a tensioning gear for the chain. The chain 11 is moved in direction of the arrow 17, the path 6 being arranged such that the plate members 5 are lifted in vertical direction along the strand 8 immediately after having passed the charging opening 4. The lowermost of the horizontal strands 7 is provided with an extension 18 which extends through the charging opening 4 in outward direction to the charging and discharging station 10, at which the dough pieces to be baked are placed onto the plate members, or the finished baked dough portions are automatically tilted off the plate members 5, respectively. A motor 19 serves for this purpose and has its driving shaft acting via a gripping means 20 on the plate members 5 located at the area of the deflection gear wheel 21 arranged at the charging and discharging station 10, so that the respective plate member 5 is tilted into the position shown in dashed lines and the finished baking good can slide off the plate member 5 and slide via a chute onto a transverse conveyor belt 23.

The baking good is baked within the baking chamber 2 by means of circulated hot air. The air is blown into the baking chamber and circulated therein by a blowing means having a blower 24 being continuously driven by a motor 25. The air is heated by a heating means 26 comprising a radiator 26 being heated by an oil or gas burner 27 (FIG. 2). The combustion gases flow through tubes 28, which are contacted by the air to be heated, into a combustion gas passage 29 wherefrom they are fed into the chimney of the bakery room. If desired, electrical heating rods arranged at the same location can be used instead of the burner 17.

The air heated by the heat radiator 26 is humidified by a humidifying means 30 (FIG. 1) disposed in a vertical passage 32 arranged at the rear wall 33 of the baking oven within the path of the air flowing in direction of the arrow 34, which passage 32 opens into the baking chamber 2 via an air supply opening 31. The air flows, after having passed the air supply opening 31, to a plurality of guide vanes 35 which guide the air into the baking chamber 2 such that this air is distributed over the rear front surface of the baking chamber 2. A part of the air is branched off via an air passage 36 arranged at the ceiling of the baking chamber 2 and arrives at the front wall 3 of the baking oven, where this air is blown into the baking chamber 2 in direction of the arrow 38 via a front wall 37 of the baking chamber 2 provided with further air supply openings 65. Within the lower portion of the baking space 2, the air is sucked out of the baking chamber 2 through a perforated portion 39 of the rear wall of the baking chamber, so that the air flowing in direction of the arrow 40 arrives via the perforated element which forms a suction opening 39, at a passage 41 leading, via the heat radiator 26, back to the suction side 42 of the blower.

The charging opening 4 can be closed by a closure means 43 being opened and, respectively, again closed in beat or in synchronism, respectively, with the movement of the stepwisely moved chain of the plate members 5. The closure means 43 is moved during those time intervals during which the stepwisely moved plate members 5 are arrested. The closure means 43 has a valve plate 44 arranged for upward and downward movement in vertical direction. The plate 44 has fixed thereto a toothed rack 45 meshing with a gear wheel 46 which is driven by a motor, not shown, for moving the valve plate 44. The valve plate 44 is guided with its both lateral edges within U-shaped guides 47 (FIG. 5) and sealed there by means of resilient sealings 48. At the lower end of the vertical stroke of the valve plate 44, this valve plate contacts a counterstop plate member 49, the top edge 50 of which is located just below the path of movement of the plate members 5 and cooperates with the lower edge, provided with a sealing lip 51, of the valve plate 44.

Means for securing the above mentioned movement in beat or in synchronism, respectively, of the closure means 43 and of the plate members 5 are wellknown for one skilled in the art so that such means need not to be described nearer in detail. For example, such means may consist of a relay inserted into the electrical supply circuit for the motor 12 driving the stepwisely moved plate members 5 and actuating the closure means 43 for the charging opening 4 as soon as the endless chain of the plate members 5 comes to a stillstand during its stepwise movement, and again opening the closure means 43 as soon as the next step of the stepwise movement of the plate members 5 begins.

Each plate member 5 is fixed at its transverse edges 2 to two lateral cheeks 52 (FIG. 4), which run by means of rollers 53,54 within pairs of U-shaped rails 55 and 56, respectively, arranged at both sides on the wall of the baking chamber 2. The respective upper pairs 55 of rails 55,56 are sunk or embedded into the wall 57 of the baking chamber 2, so that these pairs of rails 55, 56 do not disturb the movement of the valve plate 44 and the valve plate 44 can run past these rails. The respective lower rail pairs 56 are not sunk or embedded but are interrupted within the area of the charging opening 4, the width of the interruption 58 (FIG. 3) being at least equal the thickness of the valve plate 44. For preventing pendulum movement of the valve plate 44 on downward movement and out of the guides 47, the edges of the interruption 58 are provided with guide plates 59 for the valve plate 44, which guide plates 59 form a continuation of the guides 47. Any canting of the plate member 5 and of its lateral cheeks 52, respectively, at the location of the interruption 58 is avoided by the fact that each cheek 52 is guided by two rollers 54 within the lower rail pairs 56. For the upper rail pairs 55 one single roller 53 is sufficient for each cheek 52.

In order to prevent that the atmosphere within the baking chamber is expelled through the charging opening 4 by the blower 24 during that intervals during which the closure means 43 is opened, a change-over means 60 is provided for guiding the air supplied by the blower 24, said change-over means being arranged within the flow path of the air flowing from the blower 24 to the baking chamber 2 and selectively supplying this air either into the baking chamber 2 or, by by-passing the baking chamber 2, into a by-pass-channel 61, returning the air to the blower 24, thus forming a short circuit passage for the air. The actuation of this changeover means 60 is synchronized with the actuation of the closure means 43 such that air is introduced into the baking space only if the closure means 43 is in closed position. If, however, the closure means 43 is in opened position, the air is supplied into the by-pass-channel 61. For this purpose, the change-over means 60 has a lid 62 being pivotable around a horizontal axis between two end positions. In the end position shown in full lines, the lid 62 clears the supply opening 31 leading into the baking chamber 2 but closes the supply opening 63 leading into the by-pass-channel 61. In the other end position shown in dashed lines, however, the lid 62 closes the supply opening 31 leading into the baking chamber 2 but clears the supply opening 63 leading into the by-pass-channel 61. In connection with the valve plate 44 forming the closure means 43 of the charging opening 4 and being shown in its closed position with full lines in FIG. 1 and in dashed lines in FIG. 3 and being shown in its opened position with full lines in FIG. 3, ejection of hot air or saturated steam, respectively, from the baking chamber 2 is effectively prevented, because during those time intervals during which the closure means 43 assumes an opened position substantially no air circulation is effected within the baking chamber 2, which air circulation would allow humidity to escape through the charging opening 4.

The above mentioned synchronism between the actuation of the closure means 43 and the actuation of the change-over means 60 can be easily achieved by any suitable means known per se so that these means need not to be described more in detail. For example, a further relay may be inserted into the electric supply circuit of the motor 12 for driving the endless chain of the plate members 5, as mentioned above with respect to the actuation of the closure means 43. However, also one single relay is sufficient, if it is provided with two contacts, one of which controls the actuation of the motor (not shown) for moving the lid 62 of the changeover means 60 between its two end positions mentioned above, and the other contact controls the energyzing of the motor (not shown) for moving the plate 44 of the closure means 43.

When charging the baking space for the first time, i.e. until all plate members 5 have been charged with baking good, steam treatment is effected by supplying water to the humidifying means 30. With some types of baking good it is sufficient to inactivate the humidifying means if the baking oven has been filled with baking good, because the baking good itself produces during the baking process the required natural steam atmosphere which is sufficient for the steam treatment of freshly charged baking good. With other types of baking good, the arrangement can be such, that the humidifying means 30 arranged within the flow path of the air flowing to the baking space and preferably arranged upstream the change-over means 60 is supplied with water in beat, or in synchronism, respectively, with the actuation of the closure means 43 of the charging opening 4, for which actuation in beat or in synchronism, respectively, substantially the same constructional elements may be used as mentioned above with respect to the changeover means 60, the closure means 43 and the motor 12. Additional steam can be produced by a spraying device 64 being arranged behind the charging opening 4 and in close proximity thereof within that portion of the path 6 of the plate members 5 which is located immediately behind the charging opening 4, i.e. conveniently still in front of the very beginning of the vertical strand 8. This spraying device 64 sprinkles the plate members 5 and the baking good placed thereon, respectively, immediately after their introduction into the baking chamber 2. Supply of water to this spraying device 64 is synchronized with the transport of the baking good preferably such that, after having arrested the chain 11, the closure means 43 of the charging opening 4 is closed first and that only then water is sprayed onto the plate members 5 and, respectively, the dough portions placed thereon for a preselected time interval. This delay of spraying may be easily achieved by a time delay element inserted into the electrical supply circuit (not shown) of the actuating means (not shown) for the spraying device 64.

Conveniently, the baking oven has a lateral window 65 through which the baking good on the plate members 5 can be observed. It is further advantageous to provide an entry opening in the baking chamber 2 in order to enable one to eliminate operation troubles.

Figure 6:
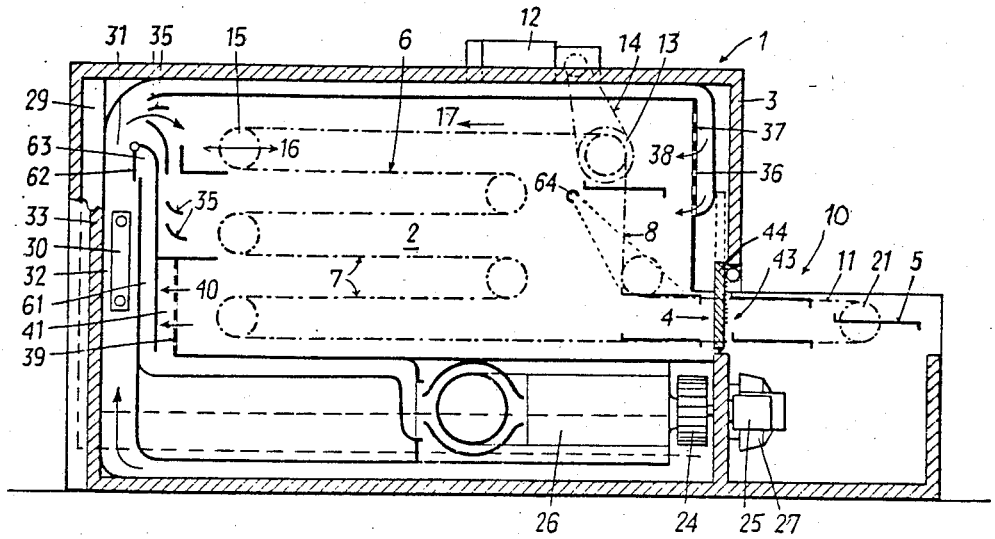
FIG. 6 shows a modified embodiment in a section similar to that of FIG. 1.

The embodiment according to FIG. 6 differs from that according to the FIGS. 1 to 5 only by the fact that the blower 24 and the heat radiator 26 are arranged within the area of the front wall 3 of the baking oven and are thus arranged at that side at which the plate members 5 are passed out of the baking oven for discharging the finished baked good and for becoming again charged. The arrangement of the air stream and of the closure means 43 is substantially the same as in the embodiment according to the FIGS. 1 to 5.

For some types of baking good it may be convenient to be in the position to deactivate the change-over means 60 such that the lid 62 is maintained in its position shown in full lines, so that also in connection with an open discharge opening 4 air is introduced into the baking chamber 2. Escape of baking atmosphere through the charging opening 4 can not be prevented in such a case, but may be desired in some cases for certain types of baking good, or, for example, for quickly heating up a cold bakery room.

What is claimed is:

1. A baking oven comprising a housing, a baking chamber surrounded by the housing and having a charging opening for the baking good, plate members for carrying the baking good, guide means for guiding the plate members in a stepwise movement and in an endless path substantially arranged within the baking chamber, blowing means for blowing hot air into the baking chamber through at least one air supply opening leading into the baking chamber, heating means for heating this air which is recycled from the baking chamber to the blowing means, comprising a by-pass-channel by-passing said baking chamber and leading back to said blowing means, a closure means for the charging opening, a charging and discharging station for the baking good, said station being located outside of the baking chamber, a branch of the endless path of the guide means for the plate members being passed through said charging openings to said charging and discharging station, a change-over means provided within the flow-path of the air flowing from the blowing means to the baking chamber for selectively feeding the air either into the baking chamber or into the by-pass-channel, and means for actuating these change-over means in timely relationship with steps of the movement of the plate members and with actuation of said closure means for the charging opening.

2. A baking oven as claimed in claim 1, wherein said by-pass-channel comprises an air inlet opening, said changeover means comprising a pivotable lid movable between two end positions, in the one of which the lid opens said air supply opening leading the air into the baking chamber and closes said air inlet opening leading into the by-pass-channel, and in the other of its end positions, the lid closes the air supply opening leading into the baking chamber and opens said air inlet opening leading into the by-pass-channel.

3. A baking oven as claimed in claim 2, wherein said baking chamber comprises a rear wall located opposite said charging opening, said air supply opening leading into the baking chamber and said air inlet opening leading into the by-pass-channel being arranged at said rear wall.

4. A baking oven as claimed in claim 3, wherein said baking chamber comprises a front wall located opposite said rear wall, further air supply openings being provided at said rear wall, an air passage being connected to said further air supply openings for supplying air.

5. A baking oven as claimed in claim 4, wherein said baking chamber comprises a ceiling, said air passage extends at said ceiling of the baking chamber and is branched-off from said flow-path of air downstream said change-over means.

6. A baking oven as claimed in claim 1, further comprising a suction opening provided in the baking chamber, said blowing means having a suction side and a passage, said by-pass-channel being connected to said passage, which leads from said suction opening to said suction side of the blowing means.

7. A baking oven as claimed in claim 1, wherein the closure means comprises a valve plate and a drive means, said valve plate being guided for vertical upward and downward movement, said movement being effected by the drive means between an end position clearing the path of the plate members carrying the baking good and an end position closing the charging opening.

8. A baking oven as claimed in claim 7, further comprising rails on the wall of the baking chamber, the plate members being guided on said rails, which at the area of the charging opening, are embedded into the wall of the baking chamber.

9. A baking oven as claimed in claim 7, further comprising rails on the wall of the baking chamber, the plate members being guided on said rails which at the area of the charging opening are interrupted.

10. A baking oven as claimed in claim 7, wherein each plate member is guided by means of two rollers fixed at both sides of the plate member on an upper rail pair which is embedded into the wall of the baking chamber at the area of the charging opening and is further guided by means of two rollers arranged at either side on a further lower non-embedded rail pair which is interrupted at the area of the charging opening.

11. A baking oven as claimed in claim 10, wherein guide plates for the valve plate are fixed to the edges of the interruption of the lower rail pair.

12. A baking oven as claimed in claim 7, wherein the valve plate at the end of its downward movement contacts a stationarily arranged counter-stop plate arranged near the rails below the path of movement of the plate members.

13. A baking oven as claimed in claim 7, further comprising a tooth rack meshing with a pinion rotated by the drive means, said tooth rack being fixed to the valve plate.

14. A baking oven as claimed in claim 1, further comprising a spraying device for sprinkling the plate members and arranged at that portion of the path of the plate members which is located immediately behind the charging opening.

15. A baking oven as claimed in claim 1, further comprising a humidifying means provided within the flow path of the air flowing to the baking chamber, said humidifying means being supplied with water in beat with the actuation of the closure means of the charging opening.

16. A baking oven as claimed in claim 15, wherein the humidifying means is arranged upstream the changeover means.

* * * * *